(12) United States Patent
Hashimoto et al.

(10) Patent No.: US 6,866,942 B1
(45) Date of Patent: Mar. 15, 2005

(54) PRESS-FORMING TAILORED BLANK MATERIAL EXCELLENT IN FORMABILITY AND PRODUCTION METHOD THEREFOR

(75) Inventors: Koji Hashimoto, Chiba (JP); Yukihisa Kuriyama, Chiba (JP); Toru Yoshida, Chiba (JP); Yasunobu Miyazaki, Chiba (JP)

(73) Assignee: Nippon Steel Corporation, Tokyo (JP)

( * ) Notice: Subject to any disclaimer, the term of this patent is extended or adjusted under 35 U.S.C. 154(b) by 113 days.

(21) Appl. No.: 10/362,459
(22) PCT Filed: Oct. 20, 2000
(86) PCT No.: PCT/JP00/07314
§ 371 (c)(1), (2), (4) Date: Jun. 11, 2003
(87) PCT Pub. No.: WO02/36281
PCT Pub. Date: May 10, 2002

(51) Int. Cl.[7] .......................... B21D 22/02; B21D 22/20; B32B 15/01; B32B 15/18; B32B 15/20
(52) U.S. Cl. ........................ 428/577; 428/683; 428/600; 148/524; 148/534; 228/155; 219/136
(58) Field of Search ............................... 428/577–581, 428/587, 600, 683, 654; 148/534, 524; 219/136, 137 R, 121.12, 121.13, 121.63, 121.64; 228/155; 29/897.2, 897

(56) References Cited

U.S. PATENT DOCUMENTS 5,641,417 A * 6/1997 Glagola et al. ..... 219/137 WM
6,060,682 A * 5/2000 Westbroek et al. .... 219/121.64
6,185,635 B1 * 2/2001 O'Loughlin et al. .......... 710/31
6,426,153 B1 * 7/2002 Duley et al. ................. 428/577
6,453,752 B1 * 9/2002 Houston et al. .............. 73/850
6,739,647 B2 * 5/2004 Obara et al. ................. 296/191

FOREIGN PATENT DOCUMENTS

| JP | 48-125 |   | 1/1973 |
| JP | 7-26346 |   | 1/1995 |
| JP | 10-180470 | * | 7/1998 |
| JP | 11-021633 | * | 1/1999 |
| JP | 11-104749 |   | 4/1999 |
| JP | 2000-015353 | * | 1/2000 |
| JP | 2000-233288 |   | 8/2000 |

* cited by examiner

Primary Examiner—John J. Zimmerman
(74) Attorney, Agent, or Firm—Wenderoth, Lind & Ponack, L.L.P.

(57) ABSTRACT

There is provided a tailored blank article for press forming, the article having an excellent formability and comprising multiple different plates of different thickness, which can evade a break of a low strength plate (or low-thickness plate) due to strength rate-determining is provided in press forming.

The tailored blank article for press forming, having an excellent formability and comprising two or more kinds of raw plates, continuously welded together, each having a different tensile strength, is characterized in that a ratio ($n_1/n_2$) of a work hardening property value ($n_1$) of a higher tensile strength plate and a work hardening property value ($n_2$) of a lower tensile strength plate is set to be 0.75 or more and 3.8 or less.

6 Claims, 3 Drawing Sheets

PRESS-FORMING TAILORED BLANK MATERIAL EXCELLENT IN FORMABILITY AND PRODUCTION METHOD THEREFOR

TECHNICAL FIELD

The present invention relates to a tailored blank article consisting of multiple different plates for use in press forming, the tailored blank article comprising two or more kinds of raw plates in combination.

More specifically, the present invention relates to a blank plate (called as a tailored blank article or a TB article) which is manufactured by welding and joining two or more kinds of plates of different thickness or of the same thickness, the plates each having different mechanical properties and being made of such as a cold-rolled steel, a hot-rolled steel, a surface treated steel, a stainless steel, an aluminum plate, an aluminum alloy, or the like. The tailored blank article consisting of multiple different plates has work hardening properties of two or more kinds of raw plates properly combined so as to increase strain of a higher-strength plate in press forming before a lower-strength plate comes into a base plate break which may be raised when strength of the raw plates differs from each other, thereby improving formability of press forming.

BACKGROUND ART

In manufacturing press parts of automobiles, two or more kinds of parts are integrally formed so as to simplify manufacturing processes and reduce the number of dies. In case of producing such united parts from raw plates, many scraps are also produced undesirably. Thus, the method of continuously welding sheet plates of the same material by the laser welding, mash seam welding, electron beam welding, TIG welding, arc welding, etc. and press-forming the resulting article integrally has been developed so as to increase the yield of the raw plate. Furthermore, taking safety at the time of collision into consideration, a tailored blank article consisting of multiple different plates is widely used. Such a tailored blank article comprises raw plates each having a different strength required for a part of the parts and different thickness and being welded continuously.

Such a tailored blank article whose plates are joined together by continuous welding has the above-described economic effect. On the other hand, there is raised a problem of defective forming at the time of press forming due to material deterioration at continuously welded portions. Breaks at the time of press forming are classified into the "ductility rate-determining mode" and the "stress rate-determining mode". In the "ductility rate-determining mode", when a blank plate is stretched parallel to welded bead portions, welded bead portions with material deterioration comes into a break. In the "stress rate-determining mode", when a blank plate is stretched while pinching the welded bead portions, the raw plate having lower strength comes into a base plate break.

To cope with such situations, a steel plate fulfilling $2.6 \leq f(C, Si, Mn, P, B) \leq 12.5$ is invented and described in Japanese Patent Laid-Open Publication No. Hei. 7-26346 as an ultra-low-carbon steel plate excellent in formability after high density energy beam welding. However, it becomes clear that use of such an ultra-low-carbon steel plate may not attain necessary strength required for a part to which high strength raw plates are applied in these days, and that there is no effect against a break in the "stress rate-determining mode" even though there is an effect against a break in the "ductility rate-determining mode" due to improvement in properties of welded bead portions.

In this point, concerning strain distribution when a break occurs in the stress rate-determining mode, strain ratio of two or more kinds of raw plates can be obtained by elementary analysis using strength ratio of the raw plates from conventional art (for example, Plasticity and Working, Vol. 32, No. 370 (1991) 1383 to 1390 by Kouichi Ikemoto and others). The relational expression of stress-strain of two kinds of materials can be shown by $\sigma_1 = K_1 \epsilon_1^{n_1}$, $\sigma_2 = K_2 \epsilon_2^{n_2}$ where suffix 1 is for a plate having a high strength and suffix 2 is for a plate having a low strength. At a joined portion, the relation of $\sigma_1 t_1 = \sigma_2 t_2$ holds since stress between the plates is balanced. Solving these equations, when a low strength plate reaches break limit, strain ($\epsilon_{1max}$) of a high strength plate is given by the following equation (1) using $TS_1$ and $TS_2$.

$$\epsilon_{1max} = n_1 \{(t_2/t_1)(TS_2/TS_1)(\exp(n_2)/(\exp(n_1))\}^{1/n_1} \quad (1)$$

where
- a: tensile stress [MPa]
- K: plasticity coefficient [MPa]
- $\epsilon$: logarithm plastic strain
- n: work hardening exponent
- TS: maximum tensile strength [MPa]

However, even though the maximum strain of a high strength plate can be calculated, there is no description about a method of solving the problem of a break in the "stress rate-determining mode." Thus, at building sites of press forming, in case the "stress rate-determining mode" of a tailored blank article consisting of multiple different plates occurs, it is required that plate thickness ratio be decreased so as to decrease raw plate strength ratio, or strength ratio be decreased.

DISCLOSURE OF THE INVENTION

Accordingly, the present invention has an object to overcome the above-mentioned drawbacks in press formability of tailored blank articles of multiple different plates in the prior art and to provide a tailored blank article consisting of multiple different plates having an excellent formability.

The present inventors have solved the problem of defective press forming of a tailored blank article consisting of multiple different plates, especially, a break in the "stress rate-determining mode" which cannot be effectively coped with so far. Specifically, the present inventors have attached importance to the work hardening properties of raw plates, and improves formability by remedying strength balance between a high strength plate and a low strength plate. The above object can be attained by providing:

(1) A tailored blank article for press forming, the article having an excellent formability and comprising two or more kinds of raw plates continuously welded together, the raw plates each having a different tensile strength, wherein a ratio ($n_1/n_2$) of a work hardening property value ($n_1$) of a higher tensile strength plate and a work hardening property value ($n_2$) of a lower tensile strength plate is set to be 0.75 or more and 3.8 or less, and a ratio of product of a tensile strength and a plate thickness ($t_1 \cdot TS_1 / t_2 \cdot TS_2$) is set to be 1.25 or more;

(2) The tailored blank article for press forming as set forth in (1), wherein the raw plates are made of steel or surface treated steel, and a tensile strength of a steel plate having a lower tensile strength is less than 380 MPa;

(3) A tailored blank article for press forming, wherein raw plates are made of steel or surface treated steel, and a tensile strength of a steel plate having a lower tensile strength is 380 MPa or more and less than 590 MPa, and a ratio ($n_1/n_2$) of work hardening property values thereof is set to be 1.0 or more and 3.8 or less; and (4) A method of manufacturing a tailored blank article for press forming, wherein a method of welding the tailored blank article as set forth in any one of (1) to (3) employs any of laser welding, mash seam welding, arc welding, electron beam welding, and TIG welding.

In the present invention, the "n" value shows the work hardening properties between tensile elongation from $\lambda_{5=5}\%$ to $\lambda_{10}=10\%$. When tensile loads at elongations of 5% and 10% are $P_5$ (N) and $P_{10}$ (N) respectively, the "n" value is defined by a value which is measured by the following equation, $$n(5\%-10\%)=[\log(P_{10}/P_5)+\log[(1+\lambda_{10}/100)/(1+\lambda_5/100)]]/[\log[\log(1+\lambda_{10}/100)/\log(1+\lambda_5/100)]]=[\log(P_{10}/P_5)+0.0202]/0.2908$$

In the present invention, raw plates used in the tailored blank article are made of cold-rolled steel, plated steel such as galvanized steel, stainless steel, and non-ferrous metal such as aluminum, etc.

The present invention will further be described below in detail.

FIG. 3 shows the relation of load-strain when a break occurs in a TB article consisting of a low strength plate and a high strength plate joined together. When the load applied to the low strength plate comes to the maximum load of the plate, the same load is applied to the high strength plate. At this time, in case the high strength plate has a low "n" value, the resulting strain is low. On the other hand, in case the high strength plate has a high "n" value, the resulting strain is high. Accordingly, by increasing the "n" value of a high strength raw plate, deformation of the high strength raw plate is promoted before a low strength raw plate comes into a break, which can contributes to the improvement of formability.

FIG. 1 shows strain values of high strength steel plates at various strength ratios according to the equation (1). As shown in FIG. 1, when the "n" value is 0.15 to 0.25, which may be those of steel plates, in case the ratio of product of raw plate strength and raw plate thickness ($t_2 \cdot TS_2/t_1 \cdot TS_1$) is less than 0.8 (1:1.25), plastic strain of a high strength steel plate is approximately 0.1 or less. Thus, the high strength steel plate hardly contributes to forming.

The maximum plastic strain ($\epsilon_{1max}$) necessary for a high strength raw plate differs according to parts. FIG. 2 shows the "n" value ($n_1$) necessary for a high strength raw plate which is obtained by reverse operation of the equation (1) for each product combination of raw plate strength and raw plate thickness.

In FIG. 2, the axis of abscissa is $\ln(t_1 \cdot TS_1/t_2 \cdot TS_2)$ representing the plate thickness-strength-product ratio, while the axis of ordinate is the ratio obtained by dividing the "n" value ($n_1$) necessary for a high strength raw plate by the "n" value ($n_2$) necessary for a low strength raw plate (assuming that $n_2=0.3$). Respective curves in FIG. 2 show the cases when the maximum plastic strains ($\epsilon_{1max}$) of high strength raw plates necessary for parts are equal to each other. For example, in case the maximum plastic strain ($\epsilon_{1max}$) of a high strength raw plate necessary for parts is 0.05 and the plate thickness-strength-product ratio of ($t_1 \cdot TS_1/t_2 \cdot TS_2$) of two kinds of raw plates is double ($\ln 2=0.69$), the "n" value ratio necessary for a high strength raw plate is ($n_1/n_2$)=1.16.

In the general steel plate manufacturing, since strength of a plate is high, the "n" value tends to become low relatively, it is difficult to make the "n" value ratio of a high strength steel plate 1 or more. However, since residual γ steel or stainless steel can be employed to provide a high "n" value, combinations fulfilling the "n" value ratios shown in FIG. 2 are possible.

Concerning the range of necessary "n" value ratio ($n_1/n_2$), when it is assumed that the plate thickness-strength-product ratio of ($t_1 \cdot TS_1/t_2 \cdot TS_2$) is 1.2 ($\ln 1.2=0.18$) or more, since plastic strain of a high strength steel plate is required to be 0.2 or more, it is necessary that the relation of ($n_1/n_2$)≧1.1 holds from FIG. 2. In a practical tailored blank article, the "n" value of a high strength plate tends to be low greatly. Thus, taking the working method into consideration so that plastic strain of a high strength steel plate is kept at the value of 0.1 or more, the relation of ($n_1/n_2$)≧0.75 is desirable. On the other hand, the maximum "n" value of a raw plate used in the present invention is approximately 0.5 of a stainless steel plate, and a general hot-rolled steel plate has a low "n" value of approximately 0.13. Thus, the relation of ($n_1/n_2$) ≦0.5/0.13=3.8 holds.

In a tailored blank article for press forming characterized in that the tensile strength of a steel plate having a low tensile strength is less than 380 MPa, the relation of 0.75≦ ($n_1/n_2$)≦3.8 holds from above reasons. On the other hand, in case of a tailored blank article for press forming characterized in that the tensile strength of a steel plate having a low tensile strength is 380 MPa or more and less than 590 MPa, since $n_2$ is low or approximately 0.15 to 0.2, it is preferred to use a diploid steel plate or a residual γ steel plate whose "n" value is 2 or more, thereby compensating formability of a steel plate having a high tensile strength. Further, it is desired that the ratio ($n_1/n_2$) of work hardening property values be set to be 1.0 (=2.0/2.0) or more.

Figure 1:
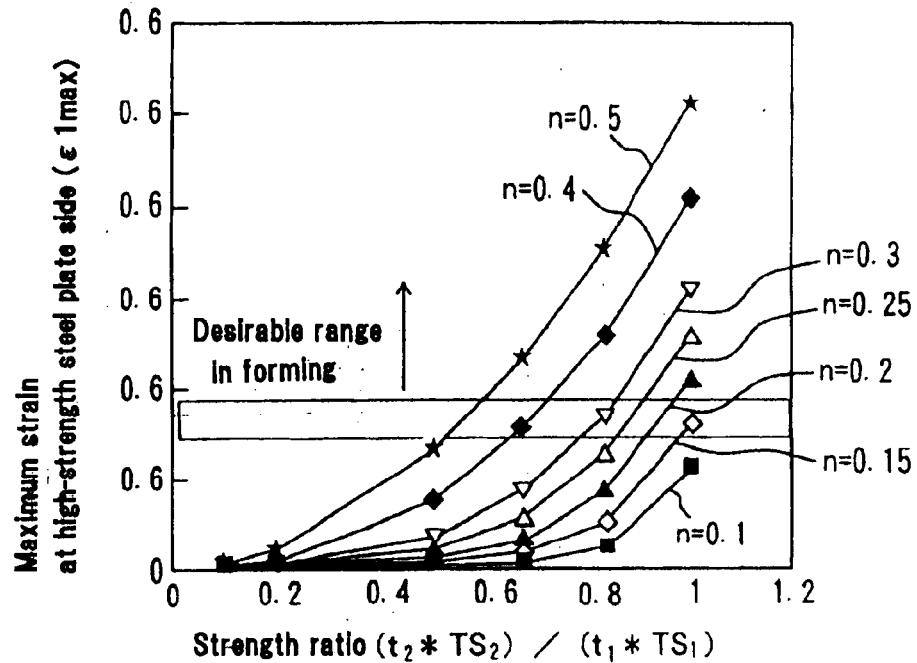
FIG. 1 shows a graph of maximum plastic strain raised at the high strength raw plate of a tailored blank article consisting of multiple different plates, obtained by calculation for each combination of raw plate strength and raw plate thickness.
Figure 2:
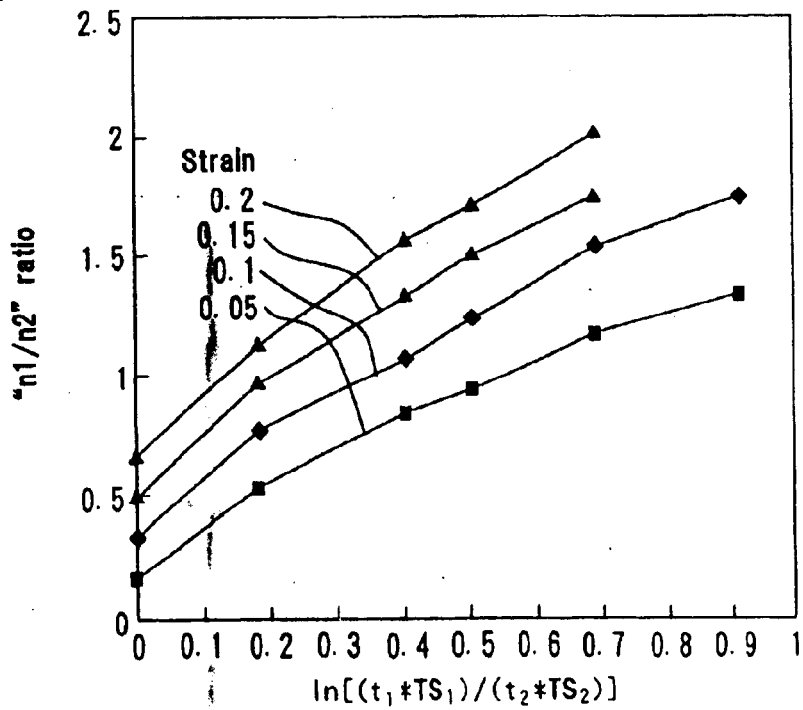
FIG. 2 shows the "n" value ratio ($n_1/n_2$) of a high strength raw plate and a low strength raw plate necessary for combinations of plate thickness-strength-product ratio for each plastic strain of a high strength raw plate, which is required in a formed product.
Figure 3:
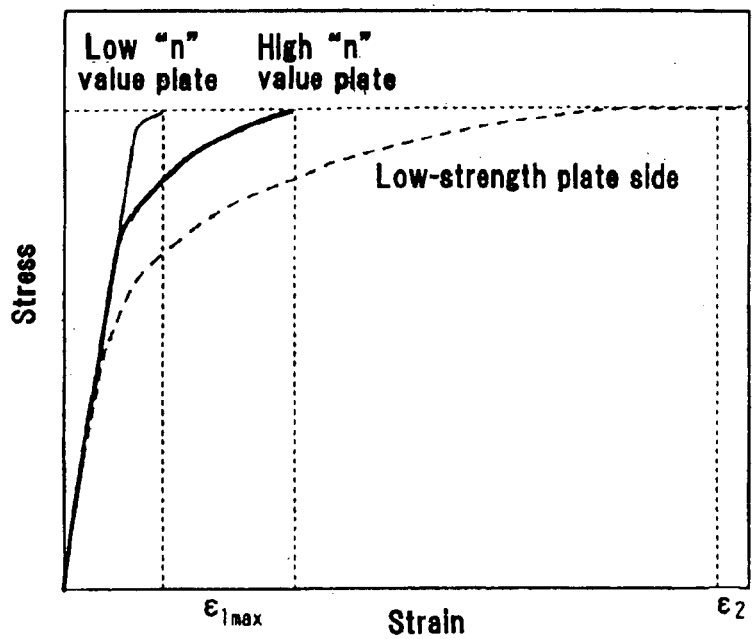
FIG. 3 shows the difference of the maximum plastic strain $\epsilon_{1max}$ of a high strength raw plate in case "n" value of the high strength raw plate is changed, and explains the mechanism of improvement in formability when a high strength raw plate having a high "n" value is employed in combination.

DESCRIPTION OF REFERENCE NUMERALS 1 die, 2 blank holding pad, 3 test plate, 4 machine oil

BEST MODE FOR CARRYING OUT THE INVENTION

The present invention will further be described below in detail with reference to embodiments, while it should be understood that the present invention is not limited to the following embodiments.

Table 1 shows properties of plates used in a tailored blank article consisting of multiple different plates, in which a soft cold-rolled steel plate (A: SPCEN) and a high strength cold-rolled steel plate (B: 440 MPa) as low strength raw plates, each being 0.80 mm in thickness, and various 590 MPa high tension steel plates (C–F) as high strength raw plates, each also being 0.80 mm in thickness, are shown. The respective tailored blank articles were formed by combining, that is, welding and joining either the A or the B plate to any one of the C–F plates using 5 kW $CO_2$ laser.

TABLE 1

Major mechanical properties of plates used in a tailored blank article consisting of multiple different plate

| Symbol | kind of steel | TS (MPa) | EL (%) | "n" value | (n1/n2) ratio against A | against B |
|---|---|---|---|---|---|---|
| A | soft cold-rolled steel plate | 304 | 48.4 | 0.254 | — | — |
| B | high-strength cold-rolled steel plate | 459 | 35.2 | 0.192 | — | — |
| C | low "n" value type 590 MPa high-tension steel plate | 614 | 26.2 | 0.145 | 0.57 | 0.76 |
| D | medium "n" value type 590 MPa high-tension steel plate | 621 | 29.0 | 0.186 | 0.73 | 0.97 |
| E | medium "n" value type 590 MPa high-tension steel plate | 597 | 30.1 | 0.199 | 0.78 | 1.04 |
| F | high "n" value type 590 MPa high-tension steel plate | 638 | 34.9 | 0.260 | 1.02 | 1.35 |

Figure 4:
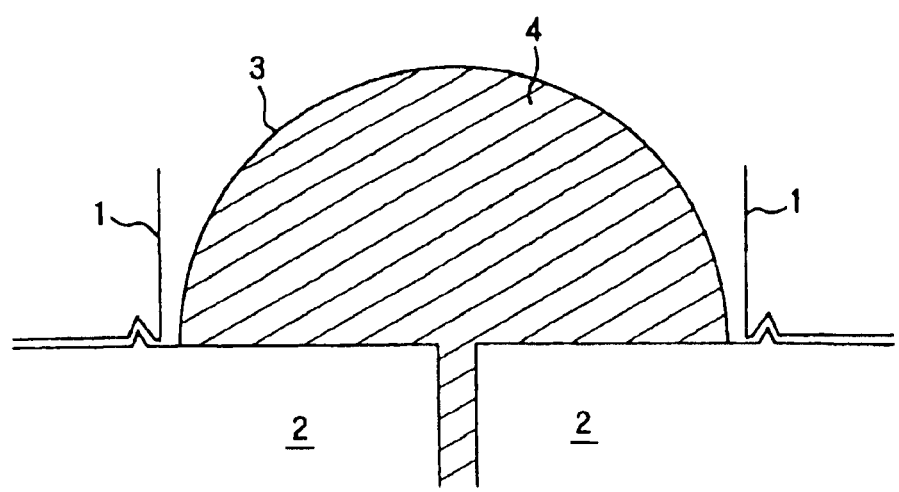
FIG. 4 shows a schematic explanatory view of the hydraulic bulge forming test used in a forming test.

FIG. 4 shows the method of the hydraulic bulge forming test used to compare formability, in which, reference numeral 1 denotes a die, reference numeral 2 denotes a blank holding pad, reference numeral 3 denotes a test plate, and reference numeral 4 denotes machine oil supplied from the die for applying hydraulic pressure.

Figure 5:
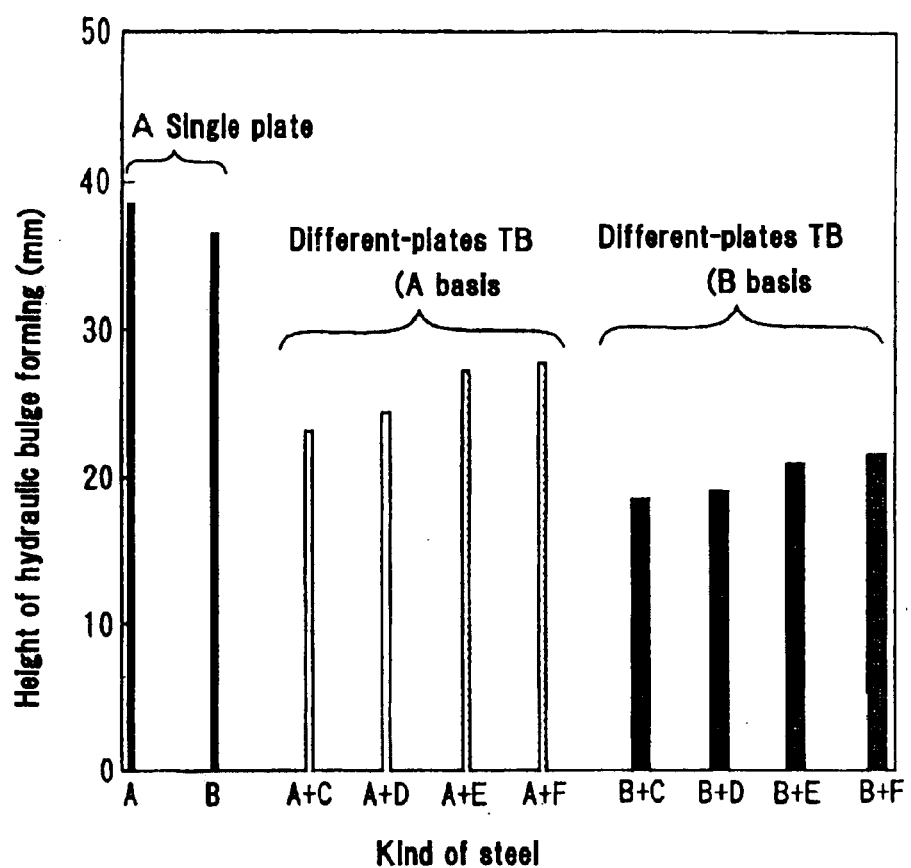
FIG. 5 shows comparison of heights of bulge forming when the hydraulic bulge forming test is performed for a tailored blank article consisting of multiple different plates.

FIG. 5 shows the result of height measurement of the hydraulic bulge forming test. The left two results are heights of bulge forming of single cold-rolled steel plate (A) and single 440 MPa high strength cold-rolled steel plate (B), and others are, from left to right, heights of bulge forming of tailored blank articles formed under the combinations of (A+C), (A+D), (A+E), (A+F), (B+C), (B+D), (B+E), and (B+F). As can be seen from the test result, the higher the "n" value of a high strength steel plate becomes, the higher the height of bulge forming becomes. Thus, in case where the tensile strength of a low strength raw plate is 304 MPa, the overhanging height exceeds 25 mm when the $(n_1/n_2)$ exceeds 0.75. On the other hand, in case where the tensile strength of a low strength raw plate is 459 MPa, the overhanging height exceeds 20 mm when the $(n_1/n_2)$ exceeds 1.0. Thus, it can be seen that the formability is significantly improved.

The break pattern is the "stress rate-determining mode" in which a low strength raw plate comes into a break.

INDUSTRIAL APPLICABILITY

According to the present invention, by giving the necessary "n" value ratio to a tailored blank article consisting of multiple different raw plates made of such as cold-rolled steel, hot-rolled steel, plated steel such as galvanized steel, stainless steel, non-ferrous metal sheet plate such as aluminum and aluminum alloy, and the like, it becomes possible to provide a tailored blank article consisting of multiple different plates which can effectively cope with a break in the "stress rate-determining mode," which cannot be effectively coped with by the conventional tailored blank article consisting of multiple different plates for improving formability.

The tailored blank article excellent in press formability according to the present invention is extremely effective in forming a deep-drawing and an overhang, and is industrially valuable.

What is claimed is:

1. A tailored blank article for press forming, the article having an excellent formability and comprising two or more kinds of raw plates continuously welded together, the raw plates each having a different tensile strength, wherein a ratio $(n_1/n_2)$ of a work hardening property value $(n_1)$ of a higher tensile strength plate and a work hardening property value $(n_2)$ of a lower tensile strength plate is set to be 0.75 or more and 3.8 or less, a ratio of product of a tensile strength and a plate thickness $(t_1 \cdot TS_1/t_2 \cdot TS_2)$ is set to be 1.25 or more.

2. The tailored blank article for press forming according to claim 1, wherein the raw plates are made of steel or surface treated steel, and a tensile strength of a steel plate having a lower tensile strength is less than 380 MPa.

3. A tailored blank article for press forming, wherein raw plates are made of steel or surface treated steel, and a tensile strength of a steel plate having a lower tensile strength is 380 MPa or more and less than 590 MPa; and a ratio $(n_1/n_2)$ of work hardening property values thereof is set to be 1.0 or more and 3.8 or less.

4. A method of manufacturing a tailored blank article for press forming, wherein a method of welding the tailored blank article as set forth in claim 1 employs any of laser welding, mash seam welding, arc welding, electron beam welding, and TIG welding.

5. A method of manufacturing a tailored blank article for press forming, wherein a method of welding the tailored blank article as set forth in claim 2 employs any of laser welding, mash seam welding, arc welding, electron beam welding, and TIG welding.

6. A method of manufacturing a tailored blank article for press forming, wherein a method of welding the tailored blank article as set forth in claim 3 employs any of laser welding, mash seam welding, arc welding, electron beam welding, and TIG welding.

* * * * *